(12) United States Patent
Dane et al.

(10) Patent No.: US 7,209,500 B2
(45) Date of Patent: Apr. 24, 2007

(54) STIMULATED BRILLOUIN SCATTERING MIRROR SYSTEM, HIGH POWER LASER AND LASER PEENING METHOD AND SYSTEM USING SAME

(75) Inventors: C. Brent Dane, Livermore, CA (US); Lloyd Hackel, Livermore, CA (US); Fritz B. Harris, Rocklin, CA (US)

(73) Assignee: Metal Improvement Company, LLC, Paramus, NJ (US)

( * ) Notice: Subject to any disclaimer, the term of this patent is extended or adjusted under 35 U.S.C. 154(b) by 280 days.

(21) Appl. No.: 10/766,635

(22) Filed: Jan. 28, 2004

(65) Prior Publication Data

US 2005/0094256 A1 May 5, 2005

Related U.S. Application Data

(60) Provisional application No. 60/515,747, filed on Oct. 30, 2003, provisional application No. 60/518,854, filed on Nov. 10, 2003.

(51) Int. Cl.
*H01S 3/10* (2006.01)

(52) U.S. Cl. .................. 372/21; 359/344; 359/345; 359/346; 359/347; 359/348; 359/349

(58) Field of Classification Search .............. 372/21; 359/344–349
See application file for complete search history.

(56) References Cited

U.S. PATENT DOCUMENTS 3,724,930 A 4/1973 Farmer
4,174,154 A 11/1979 Kawasaki
4,191,928 A 3/1980 Emmett (Continued)

FOREIGN PATENT DOCUMENTS

EP 0 827 012 A2 3/1998

(Continued)

OTHER PUBLICATIONS

Dane et al. (Design an Operation of a 150 W Near Diffraction-Limited Laser Amplifier with SBS Wavefront Correction in IEEE Journal of Quantum Electronics, vol. 31, No. 1, Jan. 1995).*

(Continued)

*Primary Examiner*—Dung (Michael) T. Nguyen
(74) *Attorney, Agent, or Firm*—Mark A. Haynes; Haynes Beffel & Wolfeld LLP

(57) ABSTRACT

A laser system, such as a master oscillator/power amplifier system, comprises a gain medium and a stimulated Brillouin scattering SBS mirror system. The SBS mirror system includes an in situ filtered SBS medium that comprises a compound having a small negative non-linear index of refraction, such as a perfluoro compound. An SBS relay telescope having a telescope focal point includes a baffle at the telescope focal point which blocks off angle beams. A beam splitter is placed between the SBS mirror system and the SBS relay telescope, directing a fraction of the beam to an alternate beam path for an alignment fiducial. The SBS mirror system has a collimated SBS cell and a focused SBS cell. An adjustable attenuator is placed between the collimated SBS cell and the focused SBS cell, by which pulse width of the reflected beam can be adjusted.

33 Claims, 7 Drawing Sheets

U.S. PATENT DOCUMENTS

| | | | |
|---|---|---|---|
| 4,205,278 A | 5/1980 | George et al. |
| 4,401,477 A | 8/1983 | Clauer et al. |
| 4,422,046 A | 12/1983 | Mumola et al. |
| 4,508,749 A | 4/1985 | Brannon et al. |
| 4,539,462 A | 9/1985 | Plankenhorn |
| 4,623,229 A | 11/1986 | Galan |
| 4,698,479 A | 10/1987 | Rando et al. |
| 4,734,911 A | 3/1988 | Bruesselbach |
| 4,794,222 A | 12/1988 | Funayama et al. |
| 4,794,345 A | 12/1988 | Linford et al. |
| 4,937,421 A | 6/1990 | Ortiz, Jr. et al. |
| 5,022,033 A | 6/1991 | Hackell |
| 5,075,893 A | 12/1991 | Epstein et al. |
| 5,118,918 A | 6/1992 | Serrano |
| 5,127,019 A | 6/1992 | Epstein et al. |
| 5,131,957 A | 7/1992 | Epstein et al. |
| 5,132,887 A | 7/1992 | Torii et al. |
| 5,142,118 A | 8/1992 | Schlatter |
| 5,239,408 A | 8/1993 | Hackel et al. |
| 5,268,787 A | 12/1993 | McIntyre |
| 5,285,310 A | 2/1994 | Miller et al. |
| 5,332,881 A | 7/1994 | Topkaya et al. |
| 5,430,748 A | 7/1995 | MacCormack et al. |
| 5,449,879 A | 9/1995 | Lawson et al. |
| 5,525,429 A | 6/1996 | Mannava et al. |
| 5,555,254 A | 9/1996 | Injeyan et al. |
| 5,569,018 A | 10/1996 | Mannava et al. |
| 5,571,575 A | 11/1996 | Takayanagi |
| 5,592,327 A | 1/1997 | Gabl et al. |
| 5,646,773 A | 7/1997 | Injeyan et al. |
| 5,670,069 A | 9/1997 | Nakai et al. |
| 5,674,328 A | 10/1997 | Mannava et al. |
| 5,674,329 A | 10/1997 | Mannava et al. |
| 5,689,363 A | 11/1997 | Dane et al. |
| 5,741,559 A | 4/1998 | Dulaney |
| 5,880,873 A | 3/1999 | Dane et al. |
| 5,986,234 A | 11/1999 | Matthews et al. |
| 5,986,236 A | 11/1999 | Gainand et al. |
| 6,127,649 A | 10/2000 | Toller et al. |
| 6,198,069 B1 | 3/2001 | Hackel et al. |
| 6,215,097 B1 | 4/2001 | Mannava |
| 6,259,055 B1 | 7/2001 | Sokol et al. |
| 6,278,543 B1 | 8/2001 | Balmer et al. |
| 6,373,876 B1 | 4/2002 | Dulaney et al. |
| 6,384,371 B1 | 5/2002 | Hinei et al. |
| 6,384,966 B1 | 5/2002 | Dymott |
| 6,462,301 B1 | 10/2002 | Scott et al. |
| 6,483,859 B1 | 11/2002 | Drake, Jr. |
| 6,528,763 B1 | 3/2003 | Lahram et al. |
| 6,747,241 B2 | 6/2004 | Shikoda et al. |
| 2002/0031158 A1 | 3/2002 | Kleinschmidt |
| 2002/0096503 A1 | 7/2002 | Hackel et al. |
| 2002/0154672 A1 | 10/2002 | Friesem et al. |
| 2003/0062468 A1 | 4/2003 | Byren et al. |
| 2003/0217997 A1 | 11/2003 | Clauer et al. |
| 2004/0200341 A1 | 10/2004 | Walters et al. |
| 2005/0094250 A1 | 5/2005 | Dane et al. |

FOREIGN PATENT DOCUMENTS

| | | |
|---|---|---|
| JP | 01-197089 | 8/1989 |
| JP | 7246483 | 9/1995 |
| WO | WO 02/090037 | 11/2002 |

OTHER PUBLICATIONS

Crofts et al. (Experimental and theoretical investigation of two-cell stimulated-Brillouin-scattering systems, J.Opt. Soc. Am. B/vol. 8, No. 11/Nov. 1991).*

Fairand, B.P. et al., "Laser shock-induced microstructural and mechanical property changes in 7075 aluminum," J. Appl. Phys. 43(9) (Sep. 1972) 3893-3895.

3M Fluorinert Liquids Product Information, 4 pages.

Crofts, G.J., et al., "Experimental and theoretical investigation of two-cell stimulated-Brillouin-scattering systems," J. Opt. Soc. Am. B 8(11) (Nov. 1991) 2282-2288.

Dane, C.B. et al., "Design and Operation of a 150 W Near Diffraction-Limited Laser Amplifier with SBS Wavefront Correction," IEEE Journal of Quantum Electronics 31(1) (Jan. 1995) 148-162.

Auerbach, J.M., et al., "Diode-pumped monolithic Nd:YLF 1.053 : m mini-laser and its application to injection seeding," Solid State Lasers SPIE 1223 (1990) 133-141.

Hanna, D.C., et al., "Single longitudinal mode selection of high power actively Q-switched lasers," Opto-Electronics 4 (1972), 249-256.

Park, Y.K., et al., "Electronic Linewidth Narrowing Method for Single Axial Mode Operation of Q-Switched Nd:YAG Lasers," Optics Communications 37(6) (Jun. 15, 1981), 411-416.

Park, Y.K., et al., "Single Axial Mode Operation of a Q-Switched Nd:YAG Oscillator by Injection Seeding," IEEE Journal of Quantum Electronics 20(2) (Feb. 1984), 117-125.

Gohil, P., et al., "Soft x-ray lithography using radiation from laser-produced plasmas," Applied Optics, v. 24, No. 13, Jul. 1, 1985, 2024-2027.

Marshall, Larry R., et al., "Continuously tunable diode-pumped UV-blue laser source," Optics Letters, vol. 18, No. 10, May 15, 1993, 817-819.

Jackel S et al., "Comparison of adaptive optics and phase-conjugate mirrors for correction of aberrations in double-pass amplifiers," Applied Optics Society of America, vol. 42:6, Feb. 20, 2003, 983-989.

Bowers M W et al., "Phase locking via briillouin-enhanced four-wave-mixing phase conjugation," IEEE Journal of quantum Electronics, vol. 34:4, Apr. 1998, 633-4.

EP Search Report, Appl. No. 04256709.9, Mar. 27, 2006.

Yoshida, H. et al., "Heavy Flurocarbon Liquids for a Phase-Conjugated Stimulated Brillouin Scattering Mirror", Applied Optics, OSA, Jun. 1, 1997, pp. 3739-3744, vol. 36, No. 16, Washington, D. C.

Yoshida, H. et al., "High-Performance Phase Conjugated Stimulated-Brillouin-Scattering Mirror Based on High-Purity-Liquid Heavy Flurocarbons", IEEE, May 22, 1995, pp. 1-2, vol. CONF. 15.

* cited by examiner

STIMULATED BRILLOUIN SCATTERING MIRROR SYSTEM, HIGH POWER LASER AND LASER PEENING METHOD AND SYSTEM USING SAME

RELATED APPLICATIONS

This application claims priority to U.S. Provisional Application No. 60/515,747 entitled STIMULATED BRILLOUIN SCATTERING MIRROR SYSTEM, HIGH POWER LASER AND LASER PEENING METHOD AND SYSTEM USING SAME, invented by Dane et al., and filed on 30 Oct. 2003, and to U.S. Provisional Application No. 60/518,854 entitled STIMULATED BRILLOUIN SCATTERING MIRROR SYSTEM, HIGH POWER LASER AND LASER PEENING METHOD AND SYSTEM USING SAME, invented by Dane et al., and filed on 10 Nov. 2003.

GOVERNMENT CONTRACT INFORMATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to methods using high power laser systems, and mirror systems for high power lasers based on Stimulated Brillouin Scattering SBS phase conjugation, to use of such lasers in master oscillator/power amplifier configurations, and to methods and systems for laser peening based on the same.

2. Description of Related Art

The use of mechanical shocks to form metals and to improve their surface properties has been realized for ages. In current industrial practice, a peening treatment of metal surfaces is accomplished by using high velocity shot. Treatment improves surface properties and very importantly for many applications, results in a part displaying significantly improved resistance to fatigue and corrosion failure. A wide range of components are shot peened in the aerospace and automotive industries. However, for many applications, shot peening does not provide sufficiently intense or deep treatment or cannot be used because of its detrimental effect on the surface finish.

With the invention of the laser, it was rapidly recognized that the intense shocks required for peening could be achieved by means of a laser-driven, tamped plasma. B. P. Fairand, et al., "Laser Shot Induced Microstructural and Mechanical Property Changes in 7075 Aluminum," Journal of Applied Physics, Vol. 43, No. 9, p. 3893, September 1972. Typically, a plasma shock of 10 kB to 30 kB is generated at metal surfaces by means of high energy density (about 200 $j/cm^2$), short pulse length (about 30 nanoseconds) lasers. A thin layer of metal tape, black paint or other absorbing material on the metal surface provides an absorber to prevent ablation of the metal. A confining or tamping material such as water covers the surface layer providing an increased intensity shock. These shocks have been shown to impart compressive stresses, deeper and more intense, than standard shot peening. In testing, this treatment has been shown to be superior for strengthening components from fatigue and corrosion failure. However, lasers with both sufficient energy and sufficient repetition rate to achieve production throughput at affordable costs have been difficult to provide.

One laser system which has been utilized for this purpose is described in our prior U.S. Pat. No. 5,239,408, entitled HIGH POWER, HIGH BEAM QUALITY REGENERATIVE AMPLIFIER. The laser system described in the just cited '408 patent comprises a high power amplifier in a master oscillator/power amplifier MOPA configuration capable of producing output pulses greater than 20 joules per pulse with the pulse width on the order of 20 to 30 nanoseconds or less using a wavefront correcting configuration based on a stimulated Brillouin scattering SBS phase conjugator/mirror system. The '408 patent refers to U.S. Pat. No. 5,022,033, entitled RING LASER HAVING AN OUTPUT AT A SINGLE FREQUENCY, as one implementation of a master oscillator. The oscillator geometry described in U.S. Pat. No. 5,022,033 produces very low energy pulses and therefore requires many more amplifier passes than is achievable with the amplifier system described in the '408 patent. In some applications, the master oscillator used in the system of the '408 patent was a standing-wave (2 mirror linear resonator) oscillator with an etalon output coupler. Another master oscillator configuration is described in our co-pending U.S. patent application Ser. No. _____, filed 30 October 2003, entitled SELF-SEEDED SINGLE-FREQUENCY SOLID-STATE RING LASER, AND SINGLE-FREQUENCY LASER PEENING METHOD AND SYSTEM USING SAME, which is incorporated by reference as if fully set forth herein.

A high power laser system such as that defined in the '408 patent, and in U.S. Pat. No. 5,689,363 "LONG-PULSE-WIDTH NARROW-BANDWIDTH SOLID STATE LASER," employs a relay telescope for relaying images of the beam from the injection end of the system to the amplifier end and back. During the amplification process the beam passes through the relay telescope, passes through an amplifier, passes back through the relay telescope and then is routed via polarization rotation followed by reflection or transmission off of a polarizer element. During the polarization splitting process, the beam is not completely separated due to less than 100% rotation of the polarization and due to less than 100% separation (contrast) by the polarizer. The non-separated portion of the beam continues passing through the relay telescope and is re-amplified, often obtaining sufficient power so that it can become a damage problem elsewhere in the optical system. Stray or "ghost" reflections can also be amplified and need to be separated from the main beam. Some type of hardware setup is needed to allow alignment of the system, and then amplification and propagation of the desired high power beams while eliminating the unwanted beams.

It has been shown by the inventors that it is very important to place a relay-image of the distorted aperture of the amplifier at the input to the SBS phase conjugate mirror. This prevents the free optical propagation of the distorted beam which can cause phase aberrations that are introduced by the amplifier to be converted into non-uniformities in the spatial profile (irradiance distribution) of the beam. This is critical since an SBS phase conjugator very effectively reverses the optical wavefront of the input beam but often does not reproduce the irradiance profile with high fidelity. Therefore, wavefront errors that are converted to irradiance distribution errors may not be adequately corrected. In the relay-imaged system, the wavefront errors are accurately transported to the SBS phase conjugator. Nonuniformities introduced by imperfect irradiance reproduction in the nonlinear mirror are then minimized in the final amplifier passes due to gain saturation in the amplifier(s).

However, the multi-pass amplifier system can generate undesirable weak "ghost" beams that result from small shortcomings in the polarization control used for beam path switching. The amplifier optical train is designed so that these weak ghosts are emitted at slightly different angles from the main beam so that they should theoretically not interfere with the SBS phase-conjugation of the much more powerful primary beam. However, when the SBS mirror is operated at very high energies, well above its threshold, these weak beams can enter the cell and, even though they would be below threshold on their own, they can be efficiently reflected by the SBS mirror in a four-wave-mixing nonlinear interaction with the main input and output beams. Such beams can then cause damage to optical components in the system as they propagate within the amplifier.

An SBS phase-conjugated MOPA laser has very robust alignment characteristics since the lowest order aberration that is corrected by the phase-conjugate mirror is tilt. This means that the laser system can be very tolerant of small drifts in the precise alignment of optical components without causing a loss in output power or causing a re-pointing of the laser output. However, delivering the beam, propagating in the forward direction, to the SBS mirror must still be accomplished with some degree of precision. Prior art systems have required periodic monitoring and alignment adjustment by very skilled scientists. Thus, tools for simplifying the alignment of the system are needed.

An important issue in the operation of a high pulse energy, high average power, solid-state laser is preventing the possibility of internal optical damage to the amplifier due to nonlinear self-focusing of the amplified beam in the SBS medium. This is caused by the fact that the presence of a high optical irradiance inside the optical gain medium can cause small changes in the effective refractive index, an effect governed by the nonlinear refractive index of the material. Since this variation in index is correlated to small irradiance variations in the beam, these irradiance variations can grow until the beam profile breaks up into very small and very intense filaments, which damage the gain medium. This process is referred to as nonlinear self-focusing and can pose a serious limitation to the maximum pulse energy and peak power available from a solid-state laser.

For a laser processing application such as laser peening or peen forming, it is important that the laser pulses have the correct pulse duration, which depends on the type and thickness of material to be treated. In the high power, short pulse length, laser systems needed for these applications, controlling pulse duration is difficult. Techniques for controlling pulse duration are desirable for such systems.

In a laser peening application and in other applications of high power laser energy to target work pieces, a pulsed laser output is directed to a target for processing. Target surfaces are often comprised of reflective surfaces such as metal tape used in a laser peening application. In laser peening, the incident laser energy breaks down the target surface and rapidly forms a high temperature plasma. When fully formed, this plasma comprises a blackbody in that it is highly absorptive. However, during the early time portion of the pulse, the target surface is reflective and if its surface normal is oriented back along the laser optical axis, significant beam energy can be reflected back to the laser. This reflected light can damage the laser optics if allowed to propagate sufficiently far back up the axis. The laser beam is typically focused onto the target surface with a set of lenses used as target delivery optics, as described in U.S. Pat. No. 6,198,069, entitled "LASER BEAM TEMPORAL AND SPATIAL TAILORING FOR LASER SHOCK PROCESSING." If the target surface were to be placed precisely at the focus of the lenses in the target delivery optics, the reflected beam would be returned with exactly reversed focusing characteristics and would match the incoming beam dimensions as it counter-propagates along the beam path. However, in most cases, the target is placed before the beam reaches focus to generate a required laser energy density in the desired spot size. In this situation, the reflected beam returns with different propagation characteristics than the incoming beam. This can cause the reflected beam to come to focus at undesirable locations in the optical beam train such as at the surfaces of critical optical components such as lenses and mirrors. This can result in permanent damage to these critical components in the optical beam train. Further, the local shape and curvature of the target can add to the focusing characteristics of the reflected beam, resulting in unexpected focused hot spots in the reflected beam. Finally, laser peening generally uses a flowing transparent liquid layer (such as water) over the treated surface. Small ripples and non-uniformities in the surface of the water can also result in beam distortion in the reflected beam and unexpected focusing characteristics. A means is needed to significantly reduce laser energy reflected back from the target to prevent damage.

SUMMARY OF THE INVENTION

The present invention provides a high power laser system and components thereof, including a high-power SBS phase conjugator/mirror system, alignment tools and optical elements for blocking ghost and unwanted beams, which address issues outlined above. The system and components thereof, are particularly useful in laser peening systems, but have many applications in high power laser systems.

The present invention is embodied by a laser system, such as a master oscillator/power amplifier system, that comprises a gain medium and a stimulated Brillouin scattering SBS mirror system having an input arranged to reflect an incident pulse back through the gain medium. The SBS mirror system is adapted to receive pulses of greater than two joules per pulse, with pulse widths of less than 1 microsecond. In some embodiments, the input pulses are greater than two joules per pulse with pulse widths less that 30 nanoseconds, including pulse widths of about 24–25 nanoseconds. The input pulses are reflected back with adjustable pulse widths in some embodiments, as described below.

The SBS mirror system includes an SBS medium that comprises a compound having a negative non-linear index of refraction with an absolute value of less than about $1 \times 10^{-12}$ esu, such as a perfluoro compound. In some embodiments, the SBS mirror system includes SBS cells adapted for in situ filtering of the SBS medium. For example, first and second SBS cells are plumbed with a pump and a filter used for filtering the SBS medium. The filter has a pore size of about 0.1 microns or smaller, to remove particulates from the SBS medium which can cause problems at the high energies encountered in embodiments of the present invention.

An SBS relay telescope having a telescope focal point is placed between a selected location in the laser system and the SBS mirror system, and relays images of an output of the gain medium between an image location on the beam line, and an image location near the input of the SBS mirror system. A baffle at the telescope focal point blocks off angle beams. In some embodiments of the system, a beam splitter is placed between the SBS mirror system and the SBS relay telescope, directing a fraction of the beam to an alternate beam path having an alternate path focal point. An alignment detector is placed at the alternate path focal point, which acts as an alignment fiducial for the laser system.

Embodiments of the invention comprise an SBS mirror system having two SBS cells. A first SBS cell is adapted to receive a collimated input. A second SBS cell is adapted to focus the beam within the SBS medium. In some embodiments of the invention, an adjustable attenuator is placed between the collimated SBS cell and the focused SBS cell, by which pulse width of the reflected beam can be adjusted.

In some embodiments of the present invention, the laser system includes an optical path having an intracavity relay telescope with a telescope focal point for imaging an output of the gain medium between an image location at or near the gain medium and an image location at or near an output coupler for the laser system. The intracavity relay telescope includes a first relay lens and a second relay lens then arranged to focus the beam at a telescope focal point within a vacuum chamber. A kinematic mount is provided within a vacuum chamber, and adapted to secure beam baffles near the telescope focal point. An access port on the vacuum chamber is adapted for allowing insertion and removal of the beam baffles. A first baffle formed using an alignment pinhole aperture is used during alignment of the laser system. A second tapered baffle replaces the alignment aperture during operation and acts as a far-field baffle. The tapered baffle comprises a solid member having an optically transparent channel, such as a hollow bored through the member. The optically transparent channel has openings on opposite ends of the solid member and a waist within the solid member near the telescope focal point. The waist is smaller than the openings on the ends. The channel has sides which taper near the waist so that off angle beams strike the baffle at a grazing angle of incidence. By striking the baffle at a grazing angle of incidence, the fluence levels at the impact areas of the blocked beams are reduced, and damage to the baffle is avoided. In some embodiments, near field baffles are also mounted on the relay telescope adjacent to at least one of the first and second relay lenses.

The present invention is also embodied by a system for applying a laser beam to work pieces. The system includes a laser system producing an output beam. Target delivery optics are arranged to deliver the output beam to a target work piece. A relay telescope having a telescope focal point is placed in the beam path between the laser system and the target delivery optics. The relay telescope relays an image between image location near the output of the laser system and an image location near the target delivery optics. A baffle is placed at the telescope focal point between the target delivery optics and the laser system to block reflections from the target in the target delivery optics from returning to laser system and causing damage.

A number of individually inventive components are combined in various embodiments of the present invention. For example, the unique SBS mirror system described above can be applied in a wide variety of environments. Likewise, the intracavity relay telescope with a tapered baffle can be applied for many high power laser systems.

One embodiment of the present invention combines these components in a high power laser system. The high power laser system includes an amplifier configuration including a gain medium, a polarization rotator, a passive polarizer and a plurality of reflectors configured to define an optical path including a ring through the gain medium, the passive polarizer and the polarization rotator. A phase conjugator is configured to receive the beam from the optical path after the pulse is proceeded one or more transits through the optical path. The phase conjugator is further configured to return the beam with reversed phase to the optical path where it proceeds an equal number of transits in the opposite direction before exiting the optical path at the passive polarizer. A master oscillator seeds the amplifier with a single frequency pulse. An intracavity relay telescope within the optical path images an output of the gain medium at the image location near the output coupler. A tapered baffle is positioned at the focal point of the relay telescope as described above. In addition, the phase conjugator is implemented using an SBS mirror system as described above. Finally, a relay telescope is used for imaging the output of the amplifier near target delivery optics, and includes a baffle for blocking back reflections from the target and target delivery optics. The laser system produces and delivers a high-power, short pulse length, high-quality beam for use in such applications as laser peening. The present invention in some embodiments delivers output pulses greater than 10 Joules per pulse, with a variable pulse width as small as 30 nanoseconds, 20 nanoseconds and less.

The present invention can also be embodied by a method for laser shock peening a target work piece. The method includes in one embodiment coupling a seed pulse into a ring shaped optical path including an amplifying medium. Next, an image of an output of the amplifying medium is relayed to an SBS phase conjugator system and phase reversing the pulse in the SBS phase conjugator system after one or more transits through the ring in which the pulse traverses the amplifying medium. Then, the method includes relaying an image of the output of the amplifying medium to an output coupler, after the pulse traverses the amplifying medium in an equal number of transits through the ring in an opposite direction to provide a wavefront corrected output pulse. The wavefront corrected output pulse comprising an image of the output of the amplifying medium is coupled out of the ring at an output coupler. The first and second relaying steps are accomplished using an intracavity relay telescope with a tapered baffle at the telescope focal point to block off angle beams. An embodiment of the method includes controlling the pulse width of the wavefront corrected output pulse by controlling a threshold of the SBS phase conjugation system. An embodiment of the method includes using an SBS medium having a low non-linear index of refraction, which has been in situ filtered to remove particulates. An embodiment of the method includes aligning the amplifier ring using an alignment fiducial in the SBS phase conjugation system. An embodiment of the method includes relaying an image of the wavefront corrected output pulse via a relay telescope outside the cavity, having a baffle at the telescope focal point, to target delivery optics, which in turn deliver the output pulse to the target work piece.

Other embodiments, aspects and advantages of the present invention can be seen on review of the drawings, the detailed description and the claims, which follow.

DETAILED DESCRIPTION

A detailed description of embodiments of the present invention is provided with reference to FIGS. 1–10.

Figure 1:
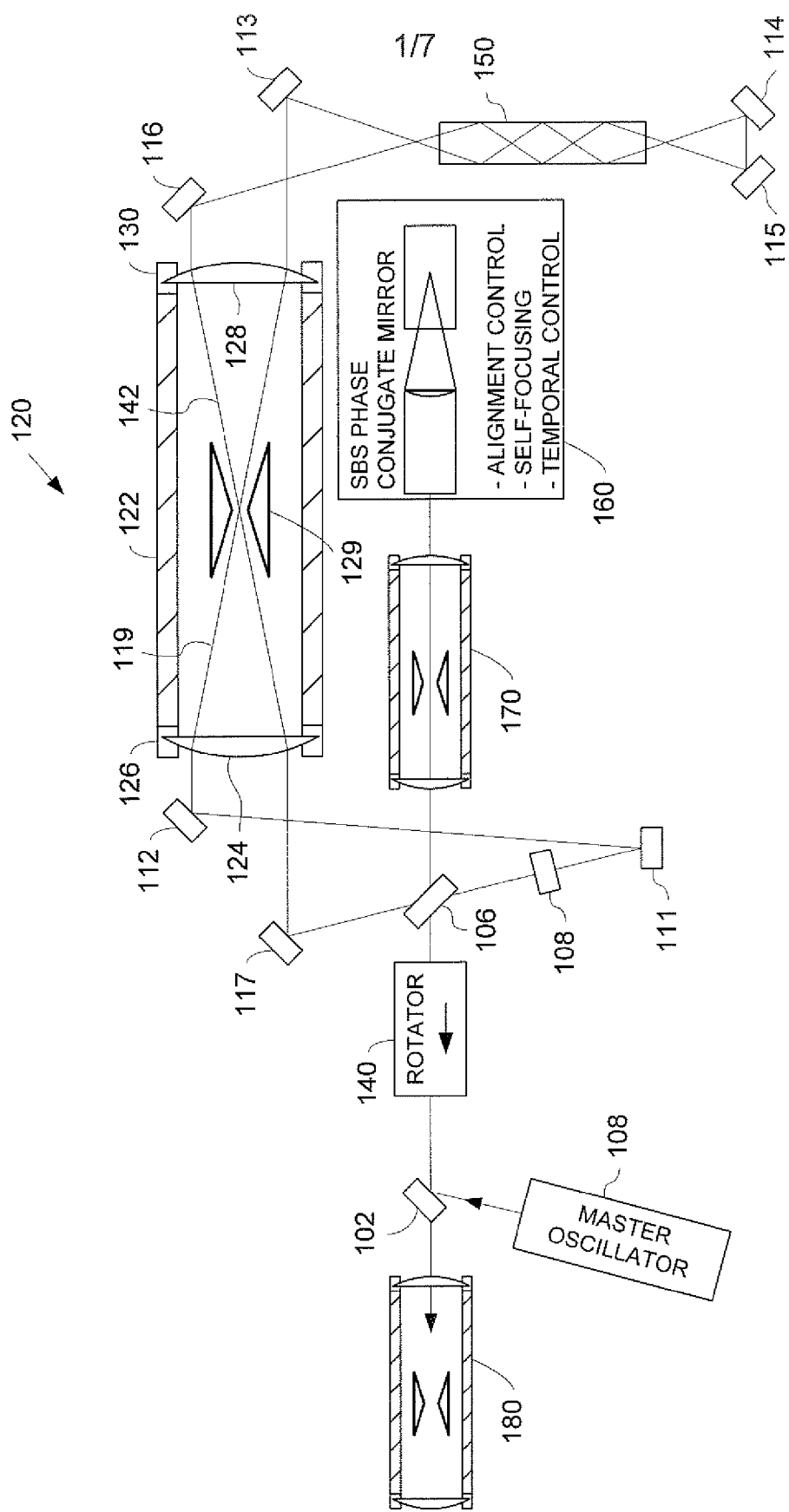
FIG. 1 is a schematic diagram of a master oscillator/power amplifier laser system according to an embodiment of the present invention.

The basic architecture of the master oscillator/power amplifier configuration with a regenerative laser amplifier including an SBS phase conjugator mirror system and relay telescope with a baffle is shown in FIG. 1. The embodiment of FIG. 1 is an improved version of a similar amplifier described in U.S. Pat. No. 5,239,408, which is incorporated by reference as if fully set forth herein. The amplifier system of FIG. 1 includes a rotator 140, such as a Pockels cell or Faraday rotator, a first intra-cavity relay telescope 120, a slab-shaped gain medium 150, a second intra-cavity relay telescope 170 and an SBS phase conjugator/mirror system 160. The slab 150 is enclosed in a pump cavity (not shown). Two polarizers 102 and 106 are also included for capturing an input pulse, and extracting an output pulse, respectively. Seven flat, highly reflecting mirrors 111, 112, 113, 114, 115, 116, and 117, define an optical path through the slab 150, and telescope 120, and polarizer 106, and telescope 170 connect the ring to SBS phase conjugator 160. An additional relay telescope 180 relays images from near the output at polarizer 160 of the ring amplifier to target delivery optics not shown.

In operation, a master oscillator 100 supplies an input pulse which has S polarization. The pulse reflects off polarizer 102, proceeds through an isolation Pockels cell 140 remaining unchanged in polarization, and is further reflected off polarizer 106 into a ring shaped optical path defined by mirrors 111–117, proceeding for this ring transit in a counter-clockwise direction off of the polarizer 106.

In the ring, the beam enters the 90 degree rotator 108 which rotates the beam by 90° to the P polarization. The pulse proceeds through mirrors 111 and 112 along optical path 119 through relay telescope 120.

The telescope 120 includes a vacuum chamber 122 having a first lens 124 mounted by a vacuum tight seal 126, and a second lens 128 mounted by vacuum tight seal 130. A baffle 129 at the telescope focal point inside the vacuum chamber 122 blocks off angle beams and ghost reflections.

From telescope 120, the beam proceeds through mirror 113 into and through the slab 150 where it is reflected by mirrors 114 and 115 back through the slab 150. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

From slab 150, the beam is reflected off mirror 116 along path 142 through telescope 120, off mirror 117 where it is reflected back into polarizer 106. Since the beam has been rotated by the 90 degree rotator 108 from the S polarization to the P polarization, the P polarized beam is transmitted by polarizer 106 to 90 degree rotator 108 to proceed through the ring counter-clockwise a second time. However, during this second pass through the ring, 90 degree rotator 108 rotates the polarization by 90° back to the S polarization. Therefore, when the beam reaches the polarizer 106 at the end of a second pass through the ring, it will be reflected into SBS phase conjugator 160, through the second intra-cavity relay telescope 170.

The beam proceeding back out of the SBS phase conjugator, still having the S polarization, but reversed phase error, will be reflected by polarizer 106 in a clockwise direction to mirror 117 where it will proceed along path 142 through telescope 120 to mirror 116. From mirror 116, the beam will proceed through slab 150 a first time and be reflected back through the slab 150 a second time by mirrors 114 and 115. Proceeding out of slab 150, the beam will be reflected off mirror 113 and proceed back through telescope 120 and mirrors 112 and 111 to 90 degree rotator 108. The 90 degree rotator 108 will rotate the polarization by 90° back to the P polarization and transmit the beam to polarizer 106, thus completing a third pass through the ring, but this time in the reverse direction from the first two passes.

Since the beam has a P polarization, the beam will pass through polarizer 106 and proceed clockwise through the ring for a fourth pass through the ring, or a second pass in the reverse direction. At the end of this fourth pass through the ring, the 90 degree rotator will rotate the polarization back to the S polarization causing the beam to reflect off of polarizer 106 out of the ring and into isolation Pockels cell 140. By this point, the net accumulated phase error is essentially zero, providing a wavefront corrected output pulse. Isolation Pockels cell 140 or Faraday rotator will rotate the polarization of the beam to the P polarization enabling the beam to pass through polarizer 102 as a high energy output pulse.

Thus, the beams passing through the amplifier illustrated in FIG. 1 exhibit reduced diffraction, minimizing the likelihood of high peak perturbations in a beam, by utilizing two paths around the ring before entering the phase conjugator, and two equal and opposite paths around a ring after exiting the phase conjugator. The ring, further, utilizes a passive polarization rotator instead of a Pockels cell. Additionally, all optical components are placed near the image planes by the use of relay telescopes (two paths through first intracavity telescope 120 and of the second intracavity telescope 170). The amplifier also exhibits higher gain to loss ratio, with two slab passes providing gain in each ring transit. The SBS phase conjugator acts as a mirror system and offsets phase aberrations in the beam. In embodiments of the invention, the SBS phase conjugator/mirror system 160 includes components used for pulse width control, used as an alignment fiducial for the optical path in the ring, and which limit self-focusing and other aberrations induced by SBS media.

The single-frequency master oscillator 100 in FIG. 1 in one preferred embodiment, comprises a relaxation pulse-seeded oscillator, which provides consistent single-frequency with good amplitude and temporal stability, with representative pulse profiles having a pulse height of greater than 1.2 megawatts and a pulse width of about 24 nanoseconds full width half maximum. Other master oscillator embodiments can be used as mentioned above. One embodiment of the relaxation pulse seeded oscillator is described in our co-pending U.S. Patent Application entitled "Self-Seeded Single-Frequency Solid-State Ring Laser, and Single-Frequency Laser Peening Method and System Using Same," application Ser. No. _____, filed on 30 October 2003, which is incorporated by reference as if fully set forth herein. The relaxation pulse seeded oscillator in one embodiment includes a laser resonator having an output coupler and a number of other reflectors defining an optical ring, preferably having an odd total number of reflectors including the output coupler. A Q-switch and a gain medium are included in the resonator. A detector is coupled with the resonator to detect oscillation energy in the resonator. A controller is coupled to a source of energy for the gain medium, to the Q-switch, and to the detector. A component in the resonator induces loss while building up gain in the gain medium with the source of pump energy, until a gain to loss ratio is achieved that is sufficient to produce a relaxation oscillation pulse. Upon detection of an onset of the relaxation pulse, the controller decreases the loss using the Q-switching so that an output pulse having a single frequency is generated. A set of etalons in the resonator restricts oscillation to a single longitudinal cavity mode during the onset of the relaxation oscillation pulse. Also, a transverse mode limiting aperture is placed in the laser resonator.

Figure 2:
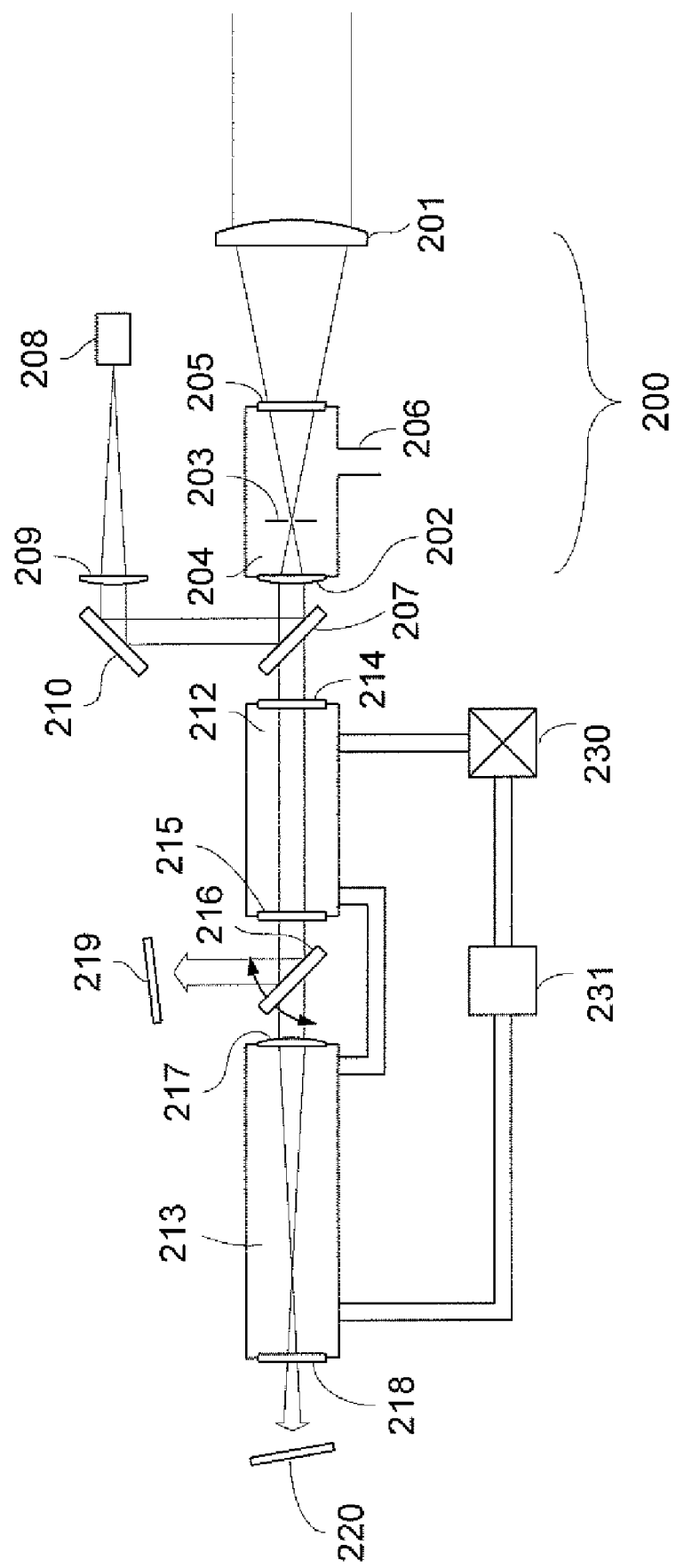
FIG. 2 is a schematic diagram of an SBS mirror system according to embodiments of the present invention.

A schematic diagram of the two-cell SBS phase conjugator mirror with spatial and temporal control is shown in FIG. 2 (note that the layout in FIG. 2 accepts a beam from the right side, rather than the left as shown in FIG. 1). After making half of the total passes through the laser amplifier(s), the beam enters this system from the right. It then passes through either a spherical or cylindrical relay telescope 200. This relay telescope 200 comprises two lenses 201, 202 spaced at the sum of their respective focal lengths. The focal region of the relay telescope is placed at vacuum to prevent optical breakdown in the air. An optical baffle 203 consisting of an aperture (or slit in the case of a cylindrical telescope) is placed in the vacuum at focus to prevent stray ghost beams propagating at slightly different angles from entering the SBS system. In the embodiment shown in FIG. 2, the relay telescope 200 includes a vacuum cylinder 204, having a flat, anti-reflective coating window 205 on one end facing lens 201, and lens 202 on the other end. A vacuum port 206 is included for maintaining vacuum inside the cylinder. A baffle 203 is mounted near the telescope focal point in the vacuum cylinder 204. In one embodiment, the relay lenses are 120 centimeter and 15 centimeter focal length cylindrical lenses, respectively, made of fused silica, A/R coated (>99.5% transmission) both sides, with a 1.5 degree optical wedge. The A/R window 205 on the vacuum cell is made with fused silica, and A/R coated both sides. The relay baffle is 2 mm wide slit made of either fused silica or Macor (machined ceramic). In alternative systems, a tapered baffle may be used.

The baffle 203 at focus consists of an aperture that only allows the angular extent of the main beam to pass while blocking the angular components associated with the ghosts. In the case of an amplifier such as a zig-zag amplifier, the primary optical distortions may only be in one beam axis (i.e. vertical or horizontal). In that case, the SBS relay telescope can use cylindrical lenses to relay only the beam dimension that suffers from distortion and in this case, rather than an aperture, the baffle can consist of a slit.

Next to the relay telescope, a beam splitter 207 reflects <1% of the incoming beam to an alignment diagnostic system providing an alignment fiducial for the laser system. The alignment diagnostic system consists of a CCD (or other electronic design) video camera 208, which is placed at the exact focus of a lens 209. Mirror 210 is used to direct the sample of the incoming beam diverted by beam splitter 207, into the lens 209 and camera 208. By monitoring the position of the focal point on the camera, the precise alignment angle of the beam through the optical amplifier system can be monitored and adjusted as needed.

The SBS system includes a collimated cell 212 and a focused cell 213. The first collimated SBS cell consists of a cylinder containing an SBS medium, and has first and second A/R coated windows 214, 215 on opposite ends through which the input and output beams pass. Only the outside surfaces are optically coated since an SBS medium is used which provides a close match in indices of refraction between the fused silica windows and the SBS medium that is sufficient to reduce reflections from the inside surfaces to acceptably low levels. A beam splitter 216 is placed in between the two SBS cells 212 and 213. It has an approximate reflectivity of 50% at 45 degrees angle of incidence. However, its reflectivity can be varied over a wide range (±30%) by rotating it by approximately ±20 degrees. The second SBS liquid cell 213 uses a focusing lens 217 as the input window and, like the windows on the first cell, only the outside surface has an optical coating. The output end of the focused cell is equipped with another A/R coated window 218 through which the small amount of unreflected light passes. Beam dumps 219, 220 (simple metal plates) are used to block the portion of the input beam that is reflected from the pulse width control beam splitter and the unreflected light that transmits through the second cell 213.

A pump 230 and filter 231 are plumbed in series with the first and second SBS cells 212, 213 in a preferred system. In alternate systems, the first and second SBS cells can be separately plumbed. The filter in one embodiment has a filter pore size of about 0.1 microns. Such filters are commercially available from Mykrolis Corporation of Billerica, Mass., including for example the Fluoriline SL-3 Disposable filter. The pump and filter are adapted to provide in situ filtration of the SBS medium, to remove particles having a size greater than about 0.1 microns from the medium. The medium can be filtered as needed, but is preferably filtered in situ at least once after filling the cells.

In a preferred embodiment of the SBS mirror system for a commercial laser peening system, the detailed component descriptions are as follows:

Alignment beam splitter 214: fused silica, A/R coated both sides, 1.5 degree optical wedge.

Alignment mirror 210: high reflectivity coating (>99.5% reflection).

Alignment diagnostic lens 209: fused silica, 50 cm focal length, A/R coated both sides.

Alignment diagnostic camera: 4×3 mm CCD video sensor.

SBS cells: all glass and PTFE (Teflon) construction.

A/R windows 207, 215, 218 on SBS cells: fused silica, A/R coated on outside surfaces, no wedge.

Adjustable beam splitter 216: fused silica, A/R coated on one side, 50% reflection on the other, reflectivity adjustable ±30% with angle.

SBS focusing lens 217: fused silica, 15 cm focal length, A/R coated outside (convex) surface.

Beam dumps 219, 220: roughened aluminum plates.

The SBS medium comprises a material, such as a perfluoro compound preferably a perfluorinated liquid, having a negative non-linear index of refraction less than about $1\times10^{-12}$ esu. Perfluoro compounds are commercially available under the trade name Fluorinert, from 3M Specialty Materials, St. Paul, Minn. Representative Fluorinert materials include FC-72, FC-75 and FC-77. FC-72 is preferred for high power applications, having a non-linear gain of about 6.2 GW/cm, Brillouin frequency shift of about 1.24 GHz, energy threshold of about 2.5 mJ (with a pulse of about 18 nanoseconds), non-linear index of refraction of about $-4.7\times10^{-13}$ esu, a frequency bandwidth of about 330 MHz, and a time constant of about 0.95 nanoseconds. The material operates reliably with very high pulse energies, for example pulse energies greater than 2 Joules per pulse in the SBS medium, with pulse widths of about 18 nanoseconds. In other embodiments, solid state SBS media may be used, including fused silica.

In operation, the incoming laser light that is focused into the second cell 213 (traveling from right to left in the schematic) reaches a sufficiently high power level to exceed the nonlinear SBS threshold. At that point, the light begins to reflect from the focused cell 213 and propagates counter (left to right) to the incoming light. As it passes through the first collimated SBS cell 212, it interacts with the incoming beam in a way to cause a large fraction of that incoming beam to be turned around (reflected) in that cell. The light reflected from the SBS phase conjugator/mirror (shifted slightly in wavelength) propagates back through the relay telescope and is delivered back into the amplifier system, as described previously in this document.

Pulse width control is provided as follows. Part of the energy of the pulse proceeds through the collimated cell 212 into the focused cell 213. The focused energy in the focused cell 213 reaches threshold more quickly than the energy in the collimated cell 212. When it is reflected back into the collimated cell 212, it interacts with the main beam to induce the reflection. The timing of the reflection from the focused cell 213 is controllable by adjusting the adjustable beam splitter 216. Higher energy will reach threshold more quickly, and vice versa. Thus, by adjusting the amount of energy input to the focused cell 213, using the adjustable beam splitter 216 in this embodiment, the timing of the leading edge of the reflected pulse can be adjusted. In effect, the width of the reflected pulse is thereby adjusted as well.

Figure 3:
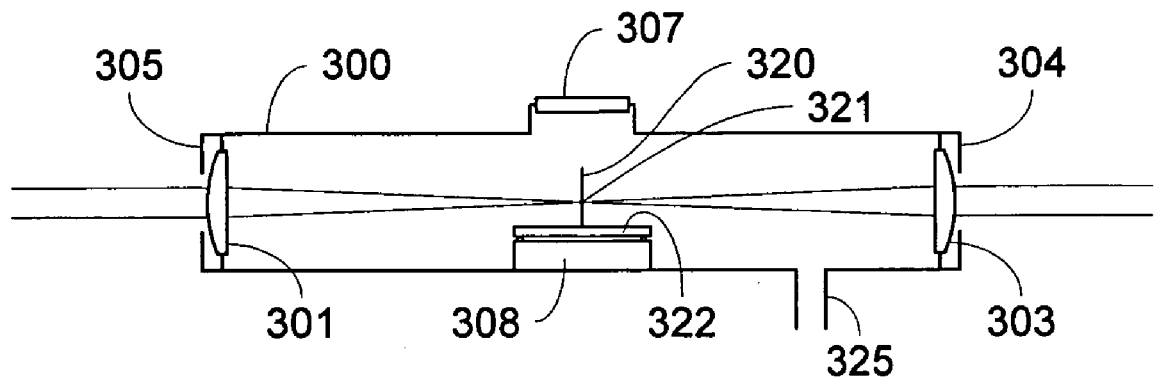
FIG. 3 illustrates an intra-cavity relay telescope including a baffle on a kinematic mount according to embodiments of the present invention, and suitable for use with the laser system of FIG. 1.

Aspects of the intracavity relay telescope 120, in which the high-energy pulses traversing the ring are brought to a focus, are illustrated with respect to FIGS. 3–7. In FIG. 3, it can be seen that the relay telescope includes a vacuum chamber 300 with a first relay lens 301 and a second relay lens 302 on opposite ends. Near field baffles 304 and 305 are formed on the relay telescope near the lenses 301 and 303. In FIG. 3, an alignment aperture 320 on a mount 322, and having a pinhole at the focal point 321 of the relay telescope, is mounted on a kinematic mount 308 within the vacuum chamber 300. The mount 322 mates with the kinematic mount 308. A vacuum port 307 provides access to the vacuum chamber 300 for replacement of the alignment aperture 320. A vacuum port 325 provides connection to a vacuum pump by which the chamber is evacuated.

Figure 4:
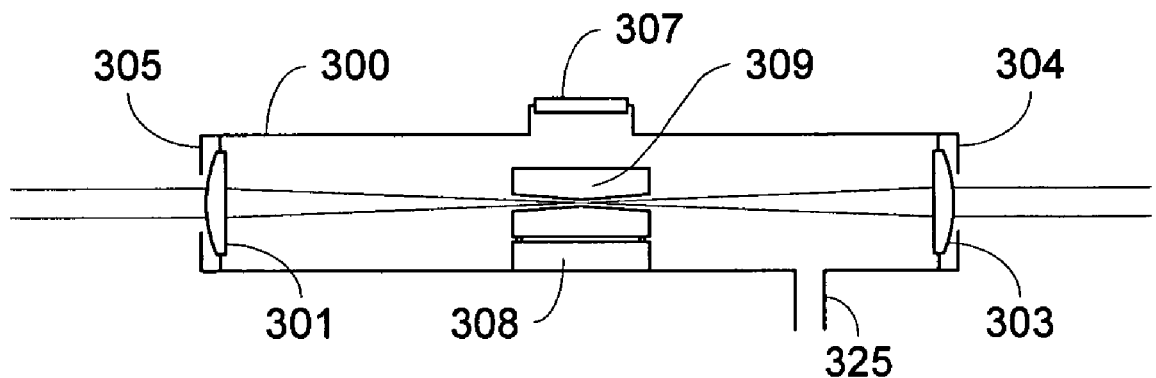
FIG. 4 illustrates the relay telescope of FIG. 3, in which the baffle on the kinematic mount is a tapered baffle, according to embodiments of the present invention, and suitable for use with the laser system of FIG. 1

FIG. 4 illustrates the relay telescope 300, in which the alignment aperture 320 has been replaced by a tapered baffle 309 designed to fit on the kinematic mount 308. In the embodiment shown in FIG. 4, representative components used in the relay telescope include relay lenses having a diameter of 170 millimeters, and a focal length of 100 centimeters. The lenses are separated by 200 centimeters. The access port is formed using a 20 centimeter vacuum conflat flange with an integral window. The near field baffles positioned near the relay lenses are 12 by 130 millimeter slots in black anodized aluminum. The alignment pinhole on the alignment aperture is a one millimeter diameter hole on a one millimeter thick stainless steel plate. The tapered baffle is assembled from two machined pieces of white Macor ceramic with a five centimeters square aperture at the waist, and tapered walls having a slope of 3 degrees. Characteristics of the tapered baffle are described in more detail with reference to FIGS. 5–7.

In embodiments of the invention, an alignment method and associated alignment aperture and baffle hardware are used first for initial alignment of a beam in a multi-pass amplifier, and secondly as a means to eliminate additional unwanted beams. The hardware contains an alignment aperture 320 in the form of a shield with a small hole, referred to as a pinhole aperture, for the initial setup and a tapered baffle 309, typically made of a high temperature resistant material such as ceramic. As compared to the small hole in the alignment aperture, the hole in the baffle is a larger single optical channel having a waist near the focal point 321 and sloping sides, at least near the waist. The sloping sides enable unwanted beams to be incepted at high angle of incidence, reducing the fluence loading on the baffle 309.

To accomplish the hardware setup, the vacuum relay telescope 120 is made to allow access to the central region for placement of the alignment and baffle hardware. A good means for access to the central region is to weld in a port 307 with removable cover just above the focal point of the lenses 301, 303. The telescope can be a tube with relay lenses attached to either end to serve as the vacuum window. Conversely, the relay telescope can be constructed with vacuum windows and external lenses. At the lens focal point, provision is made inside the tube to allow kinematic mounting and alignment of the alignment aperture 320 and subsequently the baffle 309.

Figure 5:
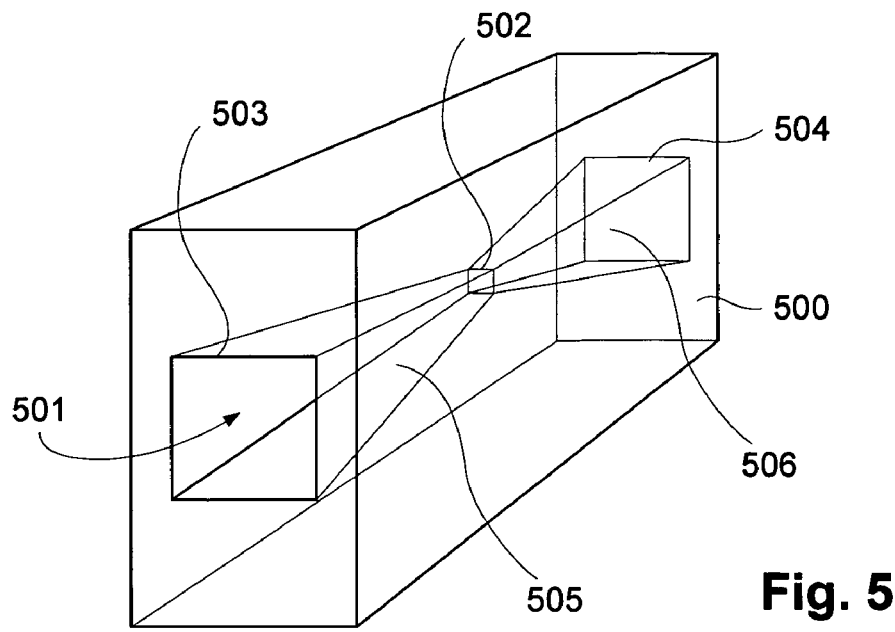
FIG. 5 shows a perspective of a tapered baffle having an optically transparent channel according to embodiments of the present invention.

FIG. 5 is a perspective view of the tapered baffle according to one embodiment of the invention. The baffle includes a solid member 500 having an optically transparent channel 501. The optically transparent channel 501 is formed by boring a hollow through the member 500, in one embodiment. The optically transparent channel 501 has a waist 502 adapted for placement near the focal point in the relay telescope. The optically transparent channel 501 has openings 503 and 504 on opposite ends, which are larger than the waist 502. Walls (e.g. 505, 506) of the optically transparent channel 501 slope from the openings 503, 504 to the waist 502 relatively gradually. In one embodiment, the openings 503 and 504, and the waist 502 are square. In other embodiments, the openings 503, 504 and the waist 502 have other shapes, such as oval, rectangular or round. The shapes of the waist 502 and of the openings 503, 504 of the baffle depend on the characteristics of the beam propagating in the relay telescope, and on the purposes of the baffle.

Figure 6:
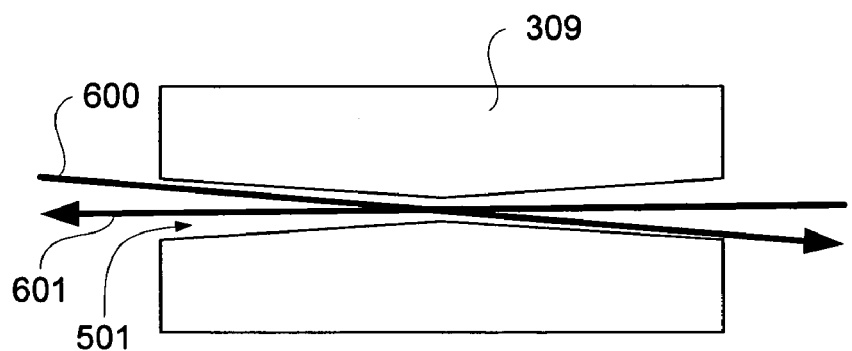
FIGS. 6 and 7 illustrate a cross-sectional view of a tapered baffle, with beam lines for passed and blocked beams, respectively.
Figure 7:
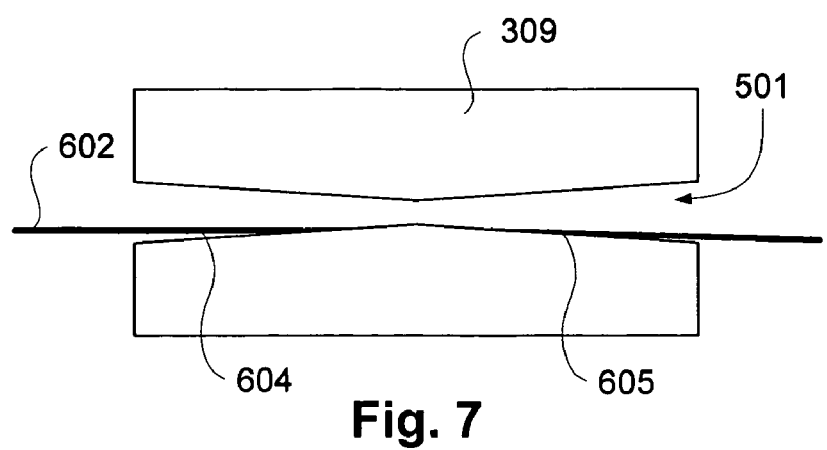

FIGS. 6 and 7 show a cross-section of the baffle 309. As shown in FIG. 6, the optically transparent channel 501 allows beams propagating along beam lines 600 and 601. As shown in FIG. 7, off angle beams, such as beam 602, are intercepted at the sloping walls 604, 605 of the baffle. In this manner, the fluence of the energy striking the baffle is reduced as it is spread out over the low angle. In one embodiment of the invention, the angle of taper of the walls 604, 605 of the optically transparent channel 501 is in the range of 1 to 10 degrees, and in one preferred embodiment is about 3 degrees.

Thus, both a vertical baffle with a small passage acting as alignment aperture 320 for determining initial alignment and the elongated, tapered baffle 309 with low sloping sides for intercepting the unwanted beams are provided with a relay telescope having a kinematic mount adapted for replacement of the alignment aperture and the baffle. After alignment the vertical baffle is removed and the system operated with the elongated baffle. The baffle assemblies fit into the central region of the relay telescope on kinematic mounts ensuring their accurate insertion as needed after initial system alignment.

The ceramic baffle 309 can be made of a machineable ceramic such as Macor. It can be made in multiple pieces and bolted together as an assembly. In one alternative embodiment, the ceramic baffle 309 includes a slot for insertion of the vertical alignment pinhole aperture. In this alternative, a hole is machined in the baffle to allow for visual observation of beam positions on the vertical alignment aperture while it is supported in the slot during alignment. In the embodiment shown, the alignment aperture 320 and the baffle 309 are separate assemblies adapted for mounting on the same kinematic mount within the vacuum chamber.

In a ring relay amplifier or a regenerative amplifier system, a light beam to be amplified typically passes through the gain media and the relay lenses multiple times. Switching of beams into and out of the ring is typically accomplished by means of polarization rotation and reflection off (or transmission through) a polarizing beam splitter. In the course of multiple passes, stray reflections can be generated off of optical surfaces and propagate back through the gain medium and the relay lenses. Additionally, the polarization switching in general is not 100% efficient and also results in residual beams passing through and being amplified by the gain medium. Both the stray beams and the residual beams can produce high intensity, damaging beams if not properly intercepted.

By intentionally tipping the multi-pass alignment away from the condition of overlapping alignment, the individual beams will come to focus at different transverse points in the focal plane. This creates a condition at the focus where the desired beams can be allowed to pass and the unwanted ones blocked. However, using a vertical blocking baffle to stop beams will not in general work because the beam intensity is so high at the focus that even the weaker unwanted beams will ablate material and make a hole through the baffle. These beams are prevented from ablating material by building a tapered baffle with extended, sloping sides within the baffle aperture. By proper arrangement of the focused beams, unwanted beams can be made to hit the sloping baffle sides, spreading their energy harmlessly over a large area.

Figure 8:
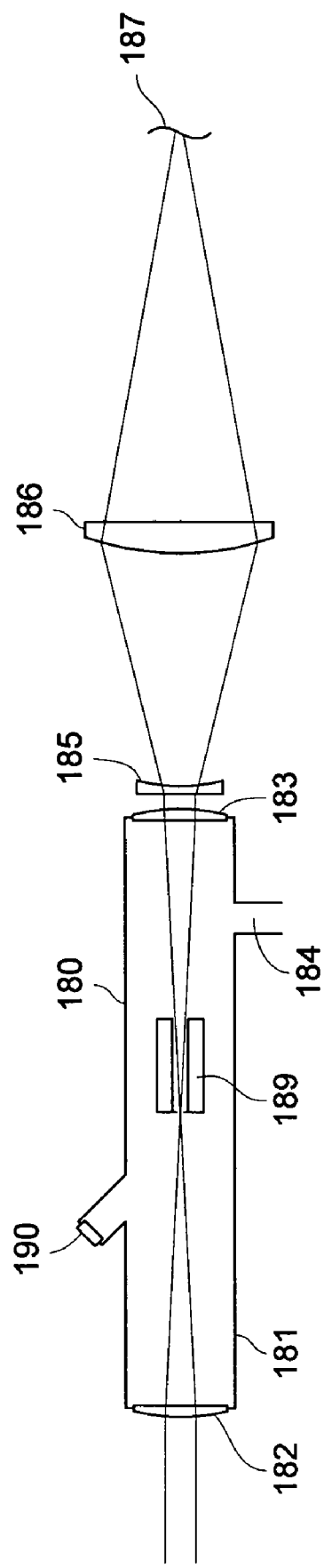
FIG. 8 is a simplified diagram of a relay telescope between a laser system and target delivery optics with a baffle, according to embodiments of the present invention.
Figure 9:
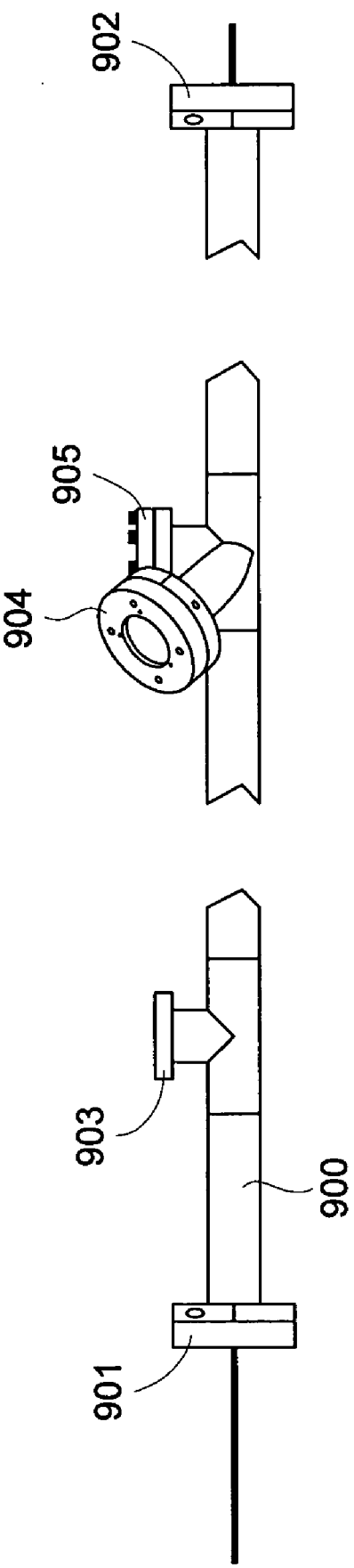
FIG. 9 illustrates aspects of a relay telescope according to embodiments of the present invention.

FIGS. 8 and 9 illustrate aspects of the relay telescope 180 which is used to relay an output pulse to target delivery optics, which condition and direct the output pulses to a target work piece. The relay telescope 180 includes a vacuum chamber 181 having relay lenses 182 and 183 on opposite ends thereof. A vacuum port 184 is coupled to a vacuum system. Lenses 185 and 186 schematically represent target delivery optics which focus the pulses on a target surface 187. The baffle 189 is included within the vacuum chamber 181. Viewing port 190 allows viewing of the aperture 189 during alignment of the telescope 180. The telescope 180 is used for transferring the output pulses over significant distances, and may be one or two meters long in a representative system. The baffle 189 may be an extended baffle as illustrated, or it may be formed on a ceramic plate with a pinhole aperture. In the extended baffle embodiment, the length of the baffle may be at least 10 and preferably greater than 100 times the spot size at focus, in order to block in-line reflections which are out of focus. The extended baffle may be implemented using a single member with a tube shaped aperture, or by a sequence of aligned plates having pinholes formed therein.

FIG. 9 shows one implementation of the relay telescope 180 made with a simple tube 900 with a vacuum pumping port 903 and input and output flanges 901 and 902 that can hold relay lenses. Alternatively the flanges can hold windows with the relay lenses placed external to the tube. Viewing port 904 is mounted adjacent an access port 905. The access port 905 allows for insertion, removal and manipulation of the baffle 189.

At the focal point of the relay lenses, the input beam will form a tight focus as it propagates to the target. Collimated light enters the relay telescope, passes through a focus and then is collimated after passing through the output relay lens. Reflected light from the target and from any optical surfaces between the relay telescope and target will propagate back toward the relay telescope. However, in general this light will not focus at the same axial or transverse point in the relay telescope. Thus, baffle 189 with a small hole just large enough to easily pass the focused light propagating to the target can block reflected light from propagating back to the laser. The return light will in general not focus exactly at the position of the incoming hole and thus be blocked from returning. In some alternatives, the baffle 189 can be extended as shown in the drawing, with an internal hole just large enough to pass the main, forward going beam. Reflected light from other optical surfaces (ghost light) will not focus at the relay telescope baffle and thus will be significantly attenuated by the ratio of the aperture size of the baffle hole to the largest spot size of the beam within the extended baffle. A viewing port 904 is added to the relay telescope to aid in aligning the system, allowing the input beam to be tilted to precisely pass through the aperture at focus. To additionally ensure that reflected light cannot propagate back from the target to the laser, the target positioning is programmed so that its surface normal is always oriented a few degrees or more off of pointing directly back along the optical axis. This way the majority of the reflected beam axis will propagate back transversely off of the incoming optic axis and will not pass the baffle system. Since much of the reflected light will be of a different focal length, it will be proportionally blocked and thus not have a tendency to ablate through the central baffle as would be the case without an extended baffle setup.

Figure 10:
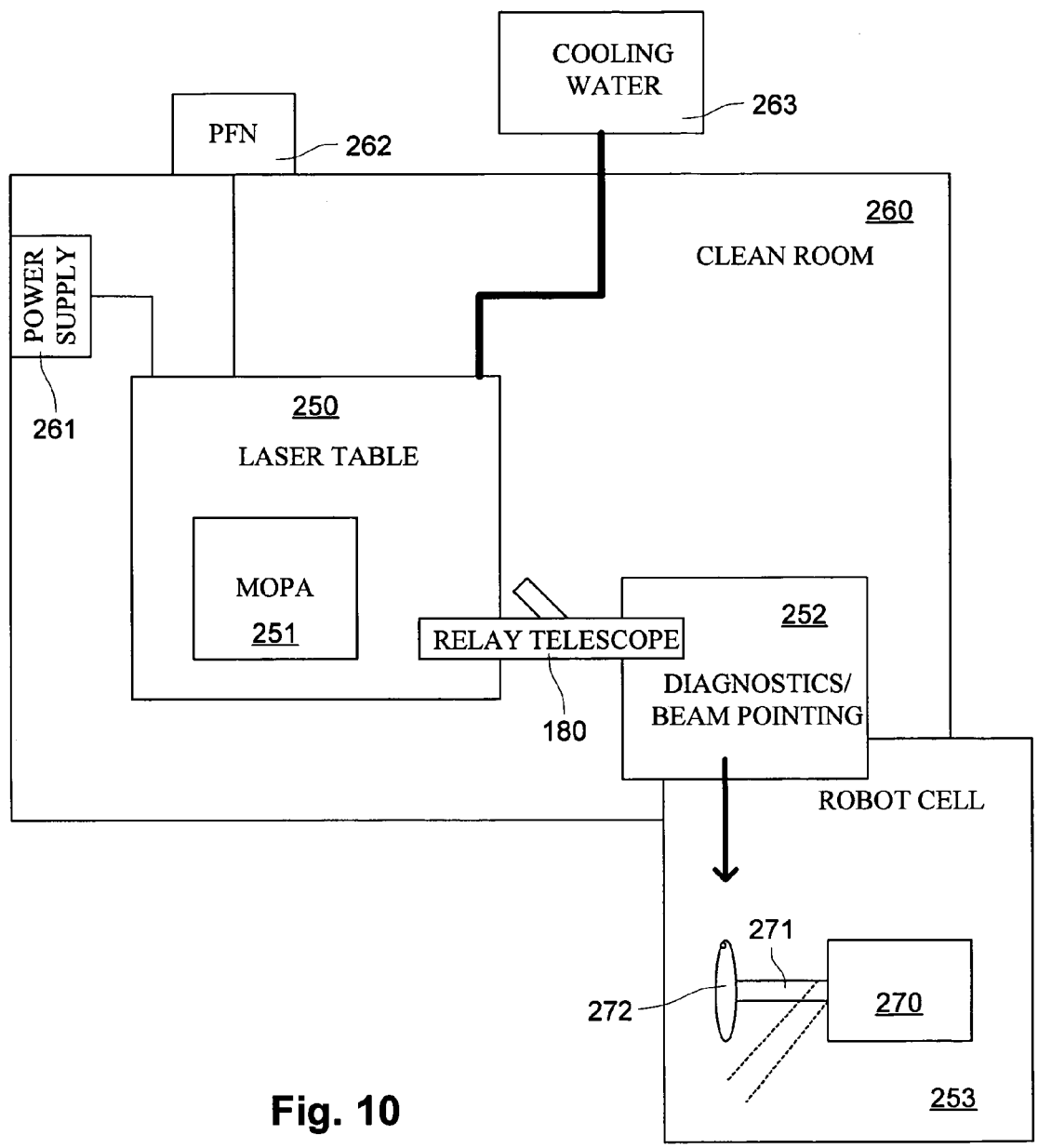
FIG. 10 is a schematic diagram of a laser peening system according to the present invention.

FIG. 10 is a simplified diagram of a production system for laser peening surfaces of work pieces using the present invention. The production system includes a low vibration laser table 250 on which a master oscillator-power amplifier MOPA system 251 is mounted. In a preferred system, the MOPA system is implemented as illustrated in FIG. 1 above. The relay telescope 180 shown in FIG. 1 extends from the laser table 250 to a second table 252 supporting diagnostics and target delivery optics. The first table 250 and the second table 251 are positioned within a cleanroom 260. A power supply 261 is coupled to the laser oscillator on the table 250. Also, a pulse forming network PFN 262, preferably located outside the cleanroom 260 is electrically coupled to the laser amplifier components on the laser table 250. Cooling water from source 263 is provided into the cleanroom 260 for cooling components of the MOPA 251. The target delivery optics on table 252 shape and direct the output pulses into a robot cell 253, outside the cleanroom 260. The robot cell 253 includes a robot 270 with a robot arm 271, used for manipulating work pieces, such as jet turbine fan or compressor blades, to receive the pulses in a laser peening operation.

A laser peening system delivers many pulses of high intensity laser light to a metal target. In the course of processing with laser peening, the metal target is caused to be oriented at many different angles with regard to the incoming beam and a high probability exists that light can be reflected directly back into the laser system. This intense reflected light can potentially damage laser components if it is allowed to reach the amplifier and optics. To prevent this situation, the relay telescope 180 with a baffle 189 placed at the focus is provided. With an appropriately sized hole in the baffle, most reflected light is prevented from propagating back to the laser.

In summary, a two-cell liquid SBS phase conjugator/mirror has been designed for use in high-pulse-energy solid-state lasers configured in a master-oscillator power-amplifier (MOPA) geometry. In particular, it is optimized for use in pulsed laser systems for commercial laser peening systems. It incorporates a number of very important and specific features to provide spatial and temporal control of the beam reflected from the SBS system. Relay imaging from the aperture of the optical-amplifier to the entrance to the phase-conjugator prevents wavefront distortions from free-propagating and causing distortion in the irradiance distribution in the beam. A baffle in the relay telescope prevents stray low power beams from entering the SBS phase-conjugate mirror and being reflected. The phase-conjugated beam is generated in a focused liquid SBS cell, and once above the SBS threshold, most of the laser power is then reflected in the collimated SBS cell. An easily adjustable beam splitter between the two cells is used to vary the threshold in the focused cell and provides a way of adjusting the pulse duration of the reflected pulse. Alignment diagnostics built into the SBS system provide verification of the alignment of the overall multi-passed amplifier beam train.

The SBS phase-conjugation system described here incorporates a far-field alignment diagnostic so that the pointing angle through the entire amplifier system, all the way to the SBS mirror, can be checked and maintained. This is implemented by a very low loss beam splitter placed between the first SBS cell and the SBS relay telescope. A small sample of the beam (<1%) is directed through a diagnostic lens, and a CCD (or other electronic variety) video camera is placed at the exact focus of the diagnostic lens. Adjusting the optical system to maintain the focused spot at approximately the same location from day-to-day ensures that the basic alignment is maintained.

For a laser processing application such as laser peening or peen forming, it is important that the laser pulses have the correct pulse duration which depends on the type and thickness of material to be treated. In this invention, we use a two-cell SBS phase-conjugation system with a very important and significant change to the standard approach used in past work. The two-cell system has been shown to be very useful for high energy SBS phase conjugation, where the process of focusing a high energy pulse into a simple SBS cell can lead to optical breakdown (an undesirable spark) at the focal point. The addition of a second collimated cell in front of the focused cell can alleviate this problem by causing much of the incoming energy to be reflected, by nonlinear SBS amplification, in the collimated cell, before even reaching the focused cell. Embodiments of the invention take advantage of the fact that the efficiency of the nonlinear SBS process is not strongly dependent on how much energy is actually reflected from the focused cell because of nonlinear gain saturation in the collimated cell. Therefore, an adjustable attenuator can be added between the two cells to vary the energy that reaches the second focused cell. By decreasing the energy in the focused cell, the nonlinear SBS threshold (point in the temporal profile before which no reflection occurs) can be delayed, thus shortening the pulse duration of the reflected pulse. In this way, fine-adjustment of the laser output pulse duration can be achieved by simply adjusting this variable loss in between the cells. Variable loss is accomplished in embodiments of the invention with a partially reflective beam splitter whose effective reflectivity is a function of the incidence angle of the beam on its surface. Simply rotating the beam splitter adjusts the energy reaching the focused cell and therefore adjusts the output pulse duration of the entire laser system.

An important aspect of this invention is the control of the nonlinear index properties of the SBS phase conjugation medium, particularly for systems with high energy pulses on the order of 2 joules per pulse at the SBS medium. We have recognized that the liquid medium used in the SBS phase conjugation cells may significantly contribute to the accumulation of nonlinear index errors (referred to in the art as the B-integral). Having recognized this, we have replaced the liquids such as acetone or carbon tetrachloride with a perfluoro compound which has a smaller nonlinear index of refraction, and under the laser conditions required for a laser peening system, eliminates previous problems caused by self-focusing damage sometimes observed after extended laser operation. Although we believe that perfluoro compounds have been investigated by others for use in SBS cells, we have invented a high energy SBS cell based on such use of such compounds. In addition, the SBS medium is filtered, in situ in some embodiments, to remove particulates having a particle size greater than about 0.1 microns.

This SBS phase-conjugator system is the optimal choice for use in high-pulse-energy solid-state MOPA (master-oscillator power-amplifier) laser systems. It has application in other laser systems, such as laser systems incorporating nonlinear frequency conversion such as in doubled and tripled lasers, Raman frequency conversion, and pumping OPOs (optical parametric oscillators) and OPAs (optical parametric amplifiers). Examples of commercial applications are in laser peening, laser peen forming, laser peen marking, and laser annealing of metals and semiconductors, and other materials processing such as cutting, welding, heat treating, UV light generation and treatment of semiconductors.

This SBS phase-conjugator design is particularly well suited to stressful environments in industrial manufacturing and other laser systems where high stability in the presence of temperature variations and mechanical vibrations are present.

In combination with the SBS mirror system described above for high power production laser systems, an inventive baffle system is placed at the focus of an intracavity relay telescope in a high power multi-pass laser system. The relay telescope includes a kinematic mount adapted to mount a first baffle with a pinhole aperture to enable an exact pre-alignment of the forward and backward traveling beams, and to mount a replacement second tapered baffle element that has a much larger hole and specially designed sloping sides to stop and scatter unwanted light beams of high fluence (energy per square cm). The pinhole baffle enables proper offsetting of the forward and backward beams and is designed to be removable. The second tapered baffle element serves as a means to effectively stop and absorb or scatter the light from residual reflections occurring from optics and light not fully removed during output polarization switching. This light in prior art systems is re-amplified to damaging levels as it transits the system and needs to be removed for damage free operation. This hardware setup of a dual element alignment pinhole and baffle system allows precise and correct alignment of the optical system through the relay telescope and at the same time eliminates unwanted beams that could be destructive.

Embodiments of this invention also include an optical system that includes an external relay telescope with a center baffle for greatly reducing reflected light from the target. The relay imaging system, as described in U.S. Pat. No. 6,198,069 "Laser beam temporal and spatial tailoring for laser shock processing" by L. A. Hackel and C. B. Dane, creates a near field image plane of the laser output at the target surface. By placing an additional relay telescope with baffle upstream of the imaging hardware, reflected target light can be almost completely eliminated from back reflection.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A stimulated Brillouin scattering SBS phase conjugate mirror system, comprising:
   a relay telescope having a telescope focal point, which relays an image of an input beam on a beam line;
   a first SBS cell in the beam line adjacent the relay telescope, and a focused SBS cell in the beam line, having an SBS focal point inside the focused SBS cell; and
   an adjustable attenuator in the beam line between the collimated SBS cell and the focused SBS cell.

2. The system of claim 1, wherein said first SBS cell comprises an SBS medium, and is adapted for a beam that is collimated or nearly collimated within the SBS medium.

3. The system of claim 1, wherein said adjustable attenuator comprises an adjustable beam splitter, by which a portion of the beam is directed out of the beam line.

4. The system of claim 1, wherein said adjustable attenuator comprises a partially reflective plate, disposed at an adjustable angle of incidence in the beam line by which a portion of the beam is directed out of the beam line, and wherein reflectivity of the partially reflective plate is variable by rotating the plate to vary the adjustable angle of incidence.

5. The system of claim 1, wherein an input beam comprising an input pulse is supplied to the relay telescope, and wherein the focused SBS cell has a nonlinear SBS threshold, and adjustment of the adjustable attenuator causes a shift in time within the pulse at which the focused SBS cell reaches the nonlinear SBS threshold, to thereby control pulse width of a reflection of the input pulse.

6. The system of claim 1, wherein the first SBS cell comprises an SBS medium, and the SBS medium comprises a perfluoro compound.

7. The system of claim 1, wherein the first SBS cell comprises an SBS medium in a sealed chamber, and the SBS medium comprises a filtered perfluoro compound having essentially no particulate contaminates greater than about 0.1 microns in size.

8. The system of claim 1, wherein the focused SBS cell comprises an SBS medium in a sealed chamber, and the SBS medium comprises a filtered perfluoro compound having essentially no particulate contaminates greater than about 0.1 microns in size.

9. The system of claim 1, wherein the first SBS cell and the focused SBS cell comprise respective SBS media in respective sealed chambers, and the SBS media comprise a filtered perfluoro compound having essentially no particulate contaminates greater than about 0.1 microns in size.

10. The system of claim 1, including:
    a beam splitter between the first SBS cell and the relay telescope, directing a fraction of the beam to an alternate beam path having an alternate path focal point; and
    an alignment detector at the alternate path focal point.

11. The system of claim 1, including:
    a baffle at the telescope focal point which blocks off angle beams.

12. The system of claim 1, wherein the first and second SBS cells comprise a fluid SBS medium, and including:
    a pump and a filter coupled to at least one of the first and second SBS cells, for in situ filtration of the fluid SBS medium.

13. The system of claim 1, wherein the first and second SBS cells comprise a fluid SBS medium, and including:
    a pump and a filter coupled to at least one of the first and second SBS cells, for in situ filtration of the fluid SBS medium, and wherein the filter has a pore size of about 0.1 microns or less.

14. A stimulated Brillouin scattering SBS phase conjugate mirror system, comprising:
    a relay telescope having a telescope focal point, which relays an image of the beam on a beam line;
    a first SBS cell in the beam line adjacent the relay telescope, and a focused SBS cell in the beam line, having an SBS focal point inside the focused SBS cell;
    a beam splitter between the first SBS cell and the relay telescope, directing a fraction of the beam to an alternate beam path having an alternate path focal point; and
    an alignment detector at the alternate path focal point.

15. A stimulated Brillouin scattering SBS phase conjugate minor system, comprising:
    a relay telescope having a telescope focal point, which relays an image of the beam on a beam line;
    a first SBS cell in the beam line adjacent the relay telescope, and a focused SBS cell in the beam line, having an SBS focal point inside the focused SBS cell, wherein at least one of the first SBS cell and the focused SBS cell have an SBS medium comprising a compound having a negative non-linear index of refraction with absolute value of less than about $1 \times 10^{-12}$ esu.

16. The system of claim 15, including:
    a pump and a filter coupled to said at least one of the first and second SBS cells, for in situ filtration of the compound.

17. The system of claim 15, including:
    a pump and a filter coupled to said at least one of the first and second SBS cells, for in situ filtration of the compound, and wherein the filter has a pore size of about 0.1 microns or less.

18. The system of claim 15, wherein said compound comprises a perfluoro compound.

19. The system of claim 15, wherein said compound comprises a perfluoro compound having a non-linear index of refraction of about $-4.7 \times 10^{-13}$ esu, a threshold of about 2.5 mJ at a pulse width of about 18 nanoseconds, and a non-linear gain of about 6.2 GW/cm.

20. A stimulated Brillouin scattering SBS phase conjugate mirror system, comprising:
- a phase conjugator comprising a first SBS cell and a focused SBS cell in a beam line, having an SBS focal point inside the focused SBS cell;
- a relay telescope having a telescope focal point, optically coupled with the phase conjugator, which relays images of an output of a gain medium between an image location on the beam line and an image location near the phase conjugator; and
- a baffle at the telescope focal point which blocks off angle beams.

21. A stimulated Brillouin scattering SBS phase conjugate mirror system, comprising:
- a relay telescope having a telescope focal point, which relays an image of the beam on a beam line;
- a first SBS cell in the beam line adjacent the relay telescope, and a focused SBS cell in the beam line, having an SBS focal point inside the focused SBS cell, wherein at least one of the collimated SBS cell and the focused SBS cell have an SBS medium comprising a compound having a negative non-linear index of refraction with absolute value of less than about $1 \times 10^{-12}$ esu;
- an adjustable attenuator between the first SBS cell and the focused SBS cell;
- a beam splitter between the first SBS cell and the relay telescope, directing a fraction of the beam to an alternate beam path having an alternate path focal point; and
- an alignment detector at the alternate path focal point; and
- a baffle having a waist near the telescope focal point which blocks off angle beams.

22. The system of claim 21, including:
a pump and a filter coupled to said at least one of the first and second SBS cells, for in situ filtration of the compound.

23. The system of claim 21, including:
a pump and a filter coupled to said at least one of the first and second SBS cells, for in situ filtration of the compound, and wherein the filter has a pore size of about 0.1 microns or less.

24. The system of claim 21, wherein said compound comprises a perfluoro compound.

25. The system of claim 21, wherein said compound comprises a perfluoro compound having a non-linear index of refraction of about $-4.7 \times 10-13$ esu, a threshold of about 2.5 mJ at a pulse width of about 18 nanoseconds, and a non-linear gain of about 6.2 GW/cm.

26. A laser system, comprising:
- a gain medium, the gain medium producing pulse energies greater than 2 joules per pulse on a beam line;
- a stimulated Brillouin scattering SBS mirror system on the beam line having an input arranged to reflect an incident pulse back through the gain medium, the SBS mirror system including an SBS medium comprising a compound having a negative non-linear index of refraction with absolute value of less than about $1 \times 10^{-12}$ esu;
- a relay telescope having a telescope focal point, between a selected location in the beam line and the SBS mirror system, which relays images of an output of the gain medium between an image location on the beam line and an image location near the input of the SBS mirror system; and
- a baffle at the telescope focal point which blocks off angle beams.

27. The system of claim 26, wherein the SBS mirror system comprises:
- a first SBS cell in the beam line adjacent the relay telescope, and a focused SBS cell in the beam line, having an SBS focal point inside the focused SBS cell; and
- an adjustable attenuator between the collimated SBS cell and the focused SBS cell.

28. The system of claim 26, including:
- a beam splitter be ween the SBS mirror system and the relay telescope, directing a fraction of the beam to an alternate beam path having an alternate path focal point; and
- an alignment detector at the alternate path focal point.

29. The system of claim 26, wherein the SBS medium comprises a perfluoro compound.

30. The system of claim 26, wherein said SBS medium comprises a perfluoro compound having non-linear index of refraction of about $-4.7 \times 10-13$ esu, a threshold of about 2.5 mJ at a pulse width of about 18 nanoseconds, and a non-linear gain of about 6.2 GW/cm.

31. The system of claim 26, including:
a pump and a filter coupled to said at least one of the first and second SBS cells, for in situ filtration of the compound.

32. The system of claim 26, including:
a pump and a filter coupled to said at least one of the first and second SBS cells, for in situ filtration of the compound, and wherein the filter has a pore size of about 0.1 microns or less.

33. A stimulated Brillouin scattering SBS phase conjugate mirror system, comprising:
- a relay telescope having a telescope focal point, which relays an image of an input beam on a beam line;
- a first SBS cell in the beam line adjacent the relay telescope, and a focused SBS cell in the beam line, having an SBS focal point inside the focused SBS cell; and
- an adjustable attenuator in the beam line between the collimated SBS cell and the focused SBS cell capable of accepting input pulses greater than 2 joules per pulse, said system accepting with input pulse widths of up to about 1 microsecond, and supply reflected pulses with adjustable pulse widths.

* * * * *

UNITED STATES PATENT AND TRADEMARK OFFICE
CERTIFICATE OF CORRECTION

| | | |
|---|---|---|
| PATENT NO. | : 7,209,500 B2 | Page 1 of 1 |
| APPLICATION NO. | : 10/766635 | |
| DATED | : April 24, 2007 | |
| INVENTOR(S) | : C. Brent Dane, Lloyd Hackel and Fritz B. Harris | |

It is certified that error appears in the above-identified patent and that said Letters Patent is hereby corrected as shown below:

Column 18, line 42, delete "minor" and replace with -- mirror --.

Column 19, line 45, delete "-4.7x10-13" and replace with -- $-4.7 \times 10^{-13}$ --.

Column 20, line 19, cancel "be ween" and replace with -- between --.

Column 20, line 28, delete "-4.7x10-13" and replace with -- $-4.7 \times 10^{-13}$ --.

Signed and Sealed this

Second Day of October, 2007

JON W. DUDAS
*Director of the United States Patent and Trademark Office*